No. 778,413. PATENTED DEC. 27, 1904.
G. M. KILMON.
PIVOT BOLT FOR OYSTER TONGS.
APPLICATION FILED MAR. 23, 1904.
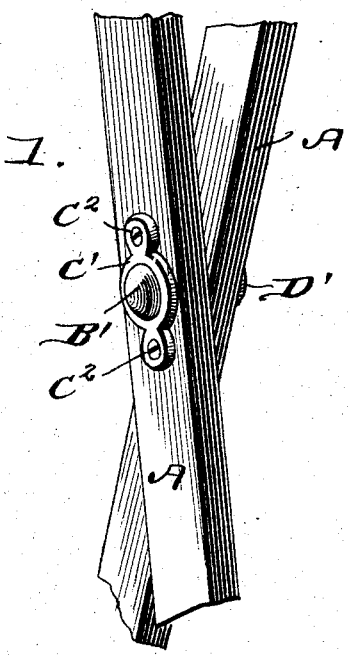
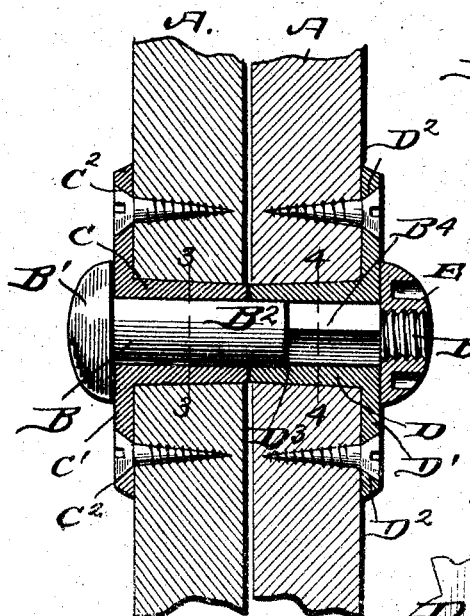
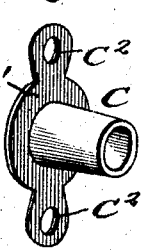
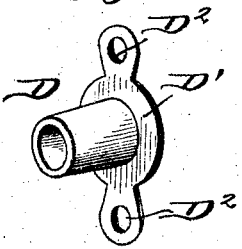
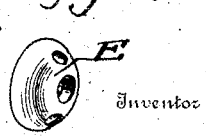
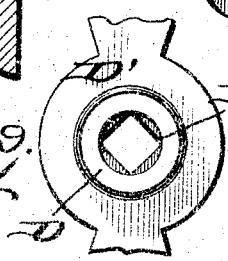
Inventor
G. M. Kilmon.
Attorneys
Witnesses No. 778,413. Patented December 27, 1904.

UNITED STATES PATENT OFFICE.

GEORGE M. KILMON, OF ROYALOAK, MARYLAND, ASSIGNOR OF ONE-HALF TO GEORGE L. CADWELL, OF BALTIMORE, MARYLAND.

PIVOT-BOLT FOR OYSTER-TONGS.

SPECIFICATION forming part of Letters Patent No. 778,413, dated December 27, 1904.

Application filed March 23, 1904. Serial No. 199,572.

*To all whom it may concern:*

Be it known that I, GEORGE M. KILMON, a citizen of the United States, residing at Royaloak, in the county of Talbot and State of Maryland, have invented a new and useful Improvement in Pivot-Bolts for Oyster-Tongs, of which the following is a specification.

This invention relates generally to oyster-tongs, and more particularly to an improved construction of pivotal connection between the poles of said tongs.

Heretofore considerable difficulty has been experienced in securing a serviceable pivotal connection between the poles. The ordinary method is to employ a wooden pin with wedges driven in the ends; but this is unsatisfactory, for the reason that the pins soon break, and, furthermore, it frequently happens that in driving in the wedges the ends of the pin are bound tightly in the poles. The ordinary iron pivot-bolt and nut are also objectionable, inasmuch as the bolt soon wears a large hole and the pivotal joint becomes loose, and very frequently in attempting to tighten the parts they are made entirely too tight.

The object of my invention is to avoid all these difficulties and to provide a pivotal connection of such a character that the poles will always be held in their proper positions and one which will permit the free and easy movement of the poles at all times and also one in which friction will be reduced to a minimum and one in which all the wear is upon the bolt and its bearings and not upon the poles.

With these objects in view my invention consists, essentially, in the employment of a pivot-bolt which is round in cross-section for the greater portion of its length, polygonal in cross-section for the remaining portion of its length, the extreme end of said bolt being reduced and threaded, and the tubular bearings through which the bolt is adapted to pass, said bearings being attached to the poles, one of said bearings having a circular bore throughout, the other bearing having a bore which is circular for a portion of its length and polygonal for the remainder of its length, whereby the polygonal portion of the bolt is held securely in said bearing, and a nut adapted to be secured upon the threaded end of the bolt for the purpose of binding all the parts together.

The invention consists also of certain details of construction and novelties of combination, all of which will be fully described hereinafter and pointed out in the claims.

In the drawings forming part of this specification, Figure 1 is a perspective view showing the practical application of my invention. Fig. 2 is a vertical sectional view, the pivot-bolt being shown in elevation. Fig. 3 is a detail section on the line 3 3 of Fig. 2. Fig. 4 is a detail section on the line 4 4 of Fig. 2. Fig. 5 is a detail perspective view of one of the bearings. Fig. 6 is a detail perspective view of the other bearing. Fig. 7 is a detail perspective view of the pivot-bolt. Fig. 8 is a detail perspective view of the nut. Fig. 9 is a detail inner face view of the bearing having the compound bore.

Referring to the drawings, A A indicate the poles carrying the tongs proper at their lower ends and the handles proper at their upper ends, said poles being pivotally connected intermediate their ends, so that the tongs can be opened and closed, as desired. As before stated, my invention resides in the peculiar form of the pivotal connection between the poles, and in carrying out my invention I employ a pivot-bolt B, provided with a head B', the main portion of said bolt being round and smooth, as shown at $B^2$, and the extreme end of the bolt is reduced and threaded, as shown at $B^3$, and between the round portion $B^2$ and the threaded portion $B^3$ is the portion $B^4$, which is polygonal in cross-section.

C and D indicate the bearings, which are inserted in circular openings produced in the poles, the outer ends of said bearings being provided with collars C' and D', respectively, which contact with the outer faces of the poles, and these collars are provided with apertured ears $C^2$ and $D^2$, respectively, through which screws are passed for the purpose of securely fastening the bearings in the poles. The tubular bearings C and D are each substantially of the same length as the thickness of the poles through which they pass, and they are so arranged that they can be brought into alinement and the pivot-bolt B passed therethrough, the bolt being inserted into bearing C and projecting therethrough into the bearing D, the threaded end extending beyond the end of said bearing and has a nut E screwed thereon. The bore of the bearing C is circular in cross-section from end to end; but the bore of the bearing D is circular in cross-section to a point marked D³ and is polygonal in cross-section from said point to the outer end of the bearing, the purpose of said compound bore being to receive the round and polygonal shaped portions of the pivot-bolt B, as most clearly shown in Fig. 2.

After the parts have been assembled as herein shown and described it is obvious that there is no wear or strain upon the wooden poles, for the reason that all the wear and strain is placed upon the pivot-bolt and the bearing C, inasmuch as the bolt and bearing D are rigid with reference to each other, inasmuch as the polygonal portion of the bolt snugly fits the polygonal portion of the bearing. Furthermore, the nut E cannot be screwed so tight as to bind the parts together, and inasmuch as the inner ends of the bearings contact with each other the poles will always be held in their proper positions, and inasmuch as the only frictional point is between the pivot-bolt and the round portions of the bearings the poles will always have a free and easy movement, thereby facilitating the operation of the tongs. It will thus be seen that I provide an exceedingly simple and efficient construction of pivotal connection, and while I have shown and described it as used in connection with oyster-tongs it is obvious that it can be used for any other purpose in which a pivotal connection between two moving members is desired.

Having thus fully described my invention, what I claim as new, and desire to secure by Letters Patent, is—

1. A pivotal connection of the kind described comprising a pair of bearings one of which has a circular bore from end to end and the other a bore circular in cross-section for a portion of its length, and non-circular in cross-section for the remainder of its length, a bolt having a circular portion and a non-circular portion together with a threaded reduced end and a nut adapted to be screwed upon said threaded end.

2. A pivotal connection of the kind described comprising a pair of bearings, each provided with means for attachment, one of said bearings having a circular bore and the other bearing having a bore circular in cross-section for a portion of its length and non-circular in cross-section for the remainder of its length, a pivot-bolt circular in cross-section for the greater portion of its length and having a reduced and threaded end, the portion of the bolt between the round and threaded portions being non-circular in cross-section, and a nut adapted to screw upon the threaded end of the bolt.

3. A pivotal connection of the kind described comprising a pair of bearings each of which has a collar provided with apertured ears, one of said bearings having a circular bore from end to end, the other bearing having a bore circular at the inner end and polygonal at the cross-section at the outer end, a pivot-bolt round in cross-section for the greater portion of its length reduced and threaded at its extreme end and polygonal in cross-section between the round portion and the threaded end, and a nut adapted to be screwed upon the threaded end of the bolt.

GEORGE M. KILMON.

Witnesses:
GUSTAVE W. RIDGELY,
CHAS. C. CADWELL.